United States Patent [19]
Jung

[11] Patent Number: 5,872,409
[45] Date of Patent: Feb. 16, 1999

[54] BEARING SYSTEM AND BRUSHLESS DC MOTOR USING SUCH SYSTEM

[75] Inventor: Sung Cheon Jung, Seoul, Rep. of Korea

[73] Assignee: Samsung Electro-Mechanics Co., Ltd., Suwon, Rep. of Korea

[21] Appl. No.: 991,973

[22] Filed: Dec. 17, 1997

[30] Foreign Application Priority Data

| Aug. 30, 1997 | [KR] | Rep. of Korea | 97-44165 |
| Aug. 30, 1997 | [KR] | Rep. of Korea | 97-44166 |
| Aug. 30, 1997 | [KR] | Rep. of Korea | 97-44167 |
| Aug. 30, 1997 | [KR] | Rep. of Korea | 97-44168 |

[51] Int. Cl.$^6$ ............. H02K 7/09; F16C 32/06; F16C 33/82
[52] U.S. Cl. ............ 310/68 B; 310/51; 310/67 R; 310/90.5; 310/90; 384/112; 384/113; 384/114; 384/107
[58] Field of Search .......... 310/90.5, 90, 68 B, 310/67 R, 51; 384/112, 114, 115, 113, 192, 193

[56] References Cited

U.S. PATENT DOCUMENTS

| 5,289,067 | 2/1994 | Tanaka et al. | 310/90.5 |
| 5,385,410 | 1/1995 | Shirai et al. | 384/446 |
| 5,417,507 | 5/1995 | Uno et al. | 384/107 |
| 5,559,382 | 9/1996 | Oku et al. | 310/90 |
| 5,723,927 | 3/1998 | Teshima | 310/90 |
| 5,751,085 | 5/1998 | Hayashi | 310/90 |

Primary Examiner—Thomas M. Dougherty
Assistant Examiner—Tran N Nguyen
Attorney, Agent, or Firm—Ladas & Parry

[57] ABSTRACT

A bearing system for brushless DC motors is disclosed. The bearing system has an electromagnetic force generator in a bearing so as to generate an electromagnetic force or a magnetic force. The bearing system thus magnetically attracts the shaft when eccentricity of the shaft in the bearing is reduced during a high speed operation of the shaft, thus allowing the shaft to keep desired eccentricity in the bearing and increasing dynamic pressure of oil in the bearing and preventing a formation of an oil whirl, and improving dynamic characteristics of the motor such as low operational vibrations and noises during a high speed operation of the motor.

22 Claims, 7 Drawing Sheets

BEARING SYSTEM AND BRUSHLESS DC MOTOR USING SUCH SYSTEM

BACKGROUND OF THE INVENTION

1. Field of the Invention

The present invention relates, in general, to brushless DC motors and, more particularly, to a bearing system capable of allowing the gap between the shaft and bearing of a brushless DC motor to keep desired eccentricity when the shaft is operated at high speeds, thus maintaining a dynamic pressure at a position between the shaft and bearing and preventing a formation of an oil whirl during a high speed operation of the motor, and improving a motor's dynamic characteristics, such as low operational vibrations and noises. The present invention also relates to a brushless DC motor using such a bearing system.

2. Description of the Prior Art

As well known to those skilled in the art, small-sized precision motors, typically used in office machines, are required to be designed to rotate at high speeds and provide dynamic characteristics of low operational vibrations and noises in order to meet the necessity of high speed operation and provide a large capacity of such office machines. Therefore, it is a recent trend to change bearings for such motors from ball bearings into hydrosintered or hydrodynamic bearings with excellent dynamic characteristics.

Figure 1:
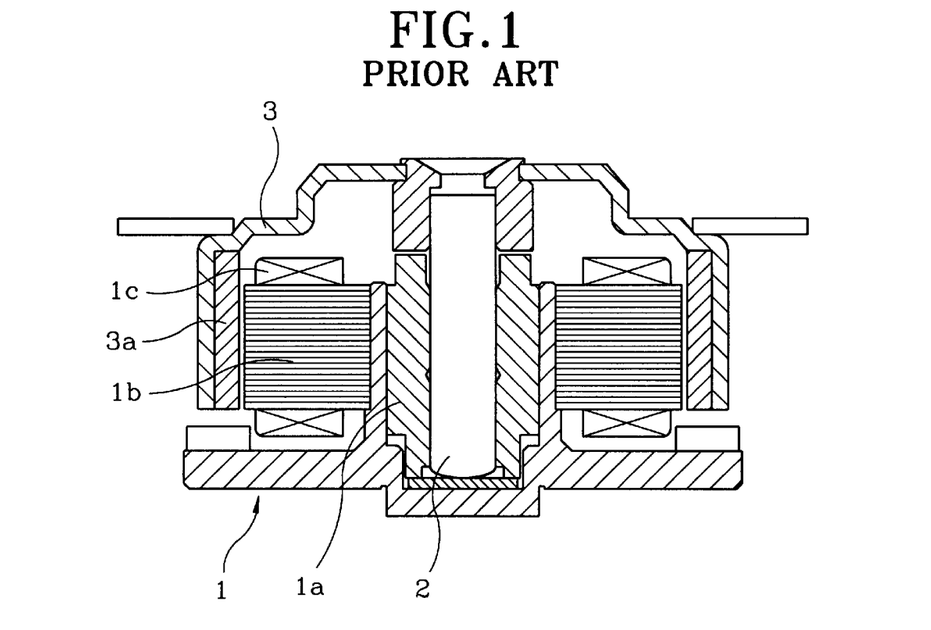
FIG. 1 is a sectional view of a spindle motor using a conventional hydrodynamic bearing for supporting a shaft in a radial direction.

FIG. 1 is a sectional view of a spindle motor using a conventional hydrodynamic bearing. As shown in the drawing, a bearing 1a is vertically and concentrically arranged on the base panel of a motor housing 1 through a fitting process, while a shaft 2 is rotatably and downwardly inserted into the bearing 1a. A core 1b, with a coil 1c, is arranged around the bearing 1a, thus forming a stator of the motor. The top end of the shaft 2 is coupled to a cap-shaped rotor 3, thus being rotatable along with the rotor 3. A cylindrical magnet 3a is attached to the inner surface of the rotor's sidewall, thus surrounding the stator 1b. When the motor is started, electric power is applied to the coil 1c of the core 1b, thus allowing the magnet 3a to generate magnetic force. The rotor 3 is thus rotated along with the shaft 2 at high speeds.

In an operation of the above spindle motor, the shaft 2 is rotated inside the bearing 1a at high speeds. In such a case, oil, filled in the gap between the bearing 1a and the shaft 2, generates a hydrodynamic pressure and effectively supports the shaft 2 in a radial direction during a high speed rotation of the shaft 2. When the shaft 2 is rotated at high speeds as described above, the rotor 3, carrying a disc (not shown) thereon, is rotated at high speeds, thus allowing data stored in the disc to be reproduced.

However, such a conventional hydrodynamic bearing for spindle motors is problematic in that it generates an oil whirl, thus being unstable during an operation of the motor. Such an oil whirl is formed as bearing eccentricity of the gap between the bearing 1a and the shaft 2 is gradually reduced at a speed higher than a predetermined level. That is, an increase in the rotating speed of the shaft 2 causes the Sommer Felt number to be reduced, thus gradually reducing eccentricity of the shaft 2 in the bearing 1a. Such a reduction in the eccentricity of the shaft 2 is caused when the oil, rotated along the shaft 2, has a given speed distribution. Such a reduction in eccentricity is typically formed in genuine circular hydrodynamic bearings free from dynamic pressure grooves. Therefore, the conventional hydrodynamic bearings reduce a motor's dynamic characteristics, such as low operational vibrations and noises, during a high speed operation of the motor.

In an effort to overcome the above problems experienced in the above spindle motors, Japanese Patent Laid-open Publication No. Hei. 7-110,028 discloses a hydrodynamic bearing. However, the above Japanese patent is problematic in that it is very difficult to form the dynamic pressure grooves on both the shaft and the bearing surface. Another disadvantage experienced in the above Japanese bearing is that the bearing reduces work efficiency while assembling the shaft with the bearing.

SUMMARY OF THE INVENTION

Accordingly, the present invention has been made keeping in mind the above problems occurring in the prior art, and an object of the present invention is to provide a bearing system for brushless DC motors, which is capable of allowing the gap between the shaft and bearing of a motor to keep desired eccentricity when the motor is operated at a speed higher than a predetermined level, thus maintaining a dynamic pressure at a position between the shaft and bearing and preventing a formation of an oil whirl during a high speed operation of the motor, and improving a motor's dynamic characteristics, such as low operational vibrations and noises.

Another object of the present invention is to provide a brushless DC motor using such a bearing system.

In order to accomplish the above objects, the bearing system for brushless DC motors in accordance with the primary embodiment of the present invention comprises: an inner wall portion interiorly and rotatably holding a shaft with a variable oil gap being defined between the shaft and the inner wall; an outer wall surrounding the inner wall and being used as a holding surface of the bearing system; at least one electromagnetic force generator adapted for selectively generating an electromagnetic force so as to magnetically and radially attract the shaft, thus forming a dynamic pressure in oil in the oil gap, the electromagnetic force generator being positioned at an intermediate portion between the inner and outer walls; top and bottom walls integrating the inner and outer walls into a single structure at the top and bottom ends of the inner and outer walls; and a controller adapted for selectively turning on the electromagnetic force generator, thus allowing the electromagnetic force generator to magnetically attract the shaft when the dynamic pressure of the oil is reduced during a high speed operation of the shaft.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 2:
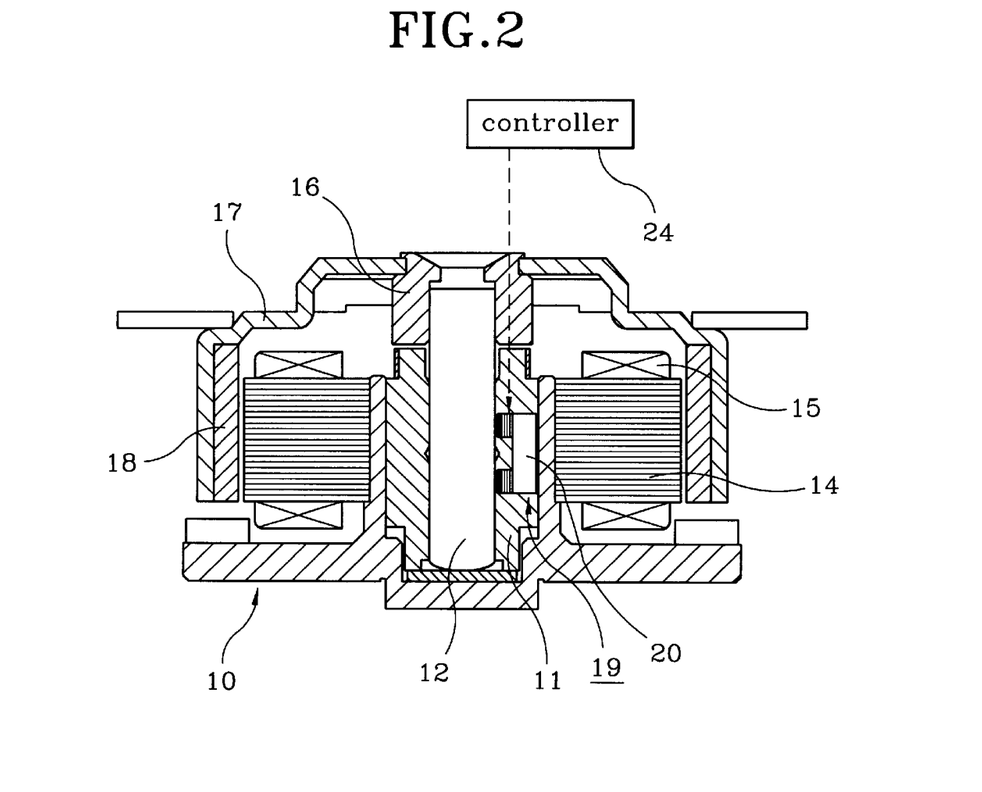
FIG. 2 is a sectional view of a brushless DC motor using a bearing system in accordance with the primary embodiment of the present invention.

FIG. 2 is a sectional view of a brushless DC motor using a bearing system in accordance with the primary embodiment of this invention. As shown in the drawing, the motor is provided with a base panel 10 for holding a bearing 11, which forms a bearing system of the motor. A stator 14, with a coil 15, is arranged around the bearing 11 on the base panel 10. A shaft 12 is rotatably fitted into the bearing 11, while a rotor holder 16 is fitted over the top end portion of the shaft 12, thus being rotatable along with the shaft 12. A rotor 17 is concentrically fitted over the rotor holder 16, thus being rotatable along with the rotor holder 16. The rotor 17 is opened downwardly and has a cylindrical sidewall which surrounds the stator 14. A cylindrical magnet 18 is attached to the inner surface of the rotor's sidewall with an air gap being formed between the stator 14 and the magnet 18. When the motor is started, electric power is applied to the coil 15 of the stator 14, thus allowing the magnet 18 to generate magnetic force. The rotor 17 is thus rotated along with the shaft 12 at high speeds.

Figure 3:
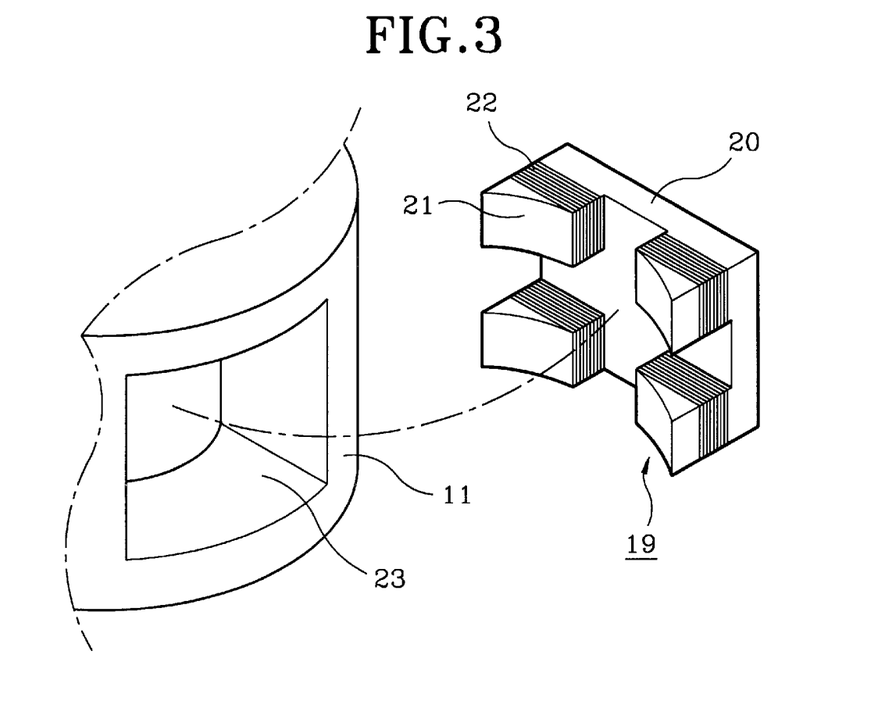
FIG. 3 is an exploded perspective view showing the construction of an electromagnetic force generator included in the bearing system of FIG. 2.
Figure 4:
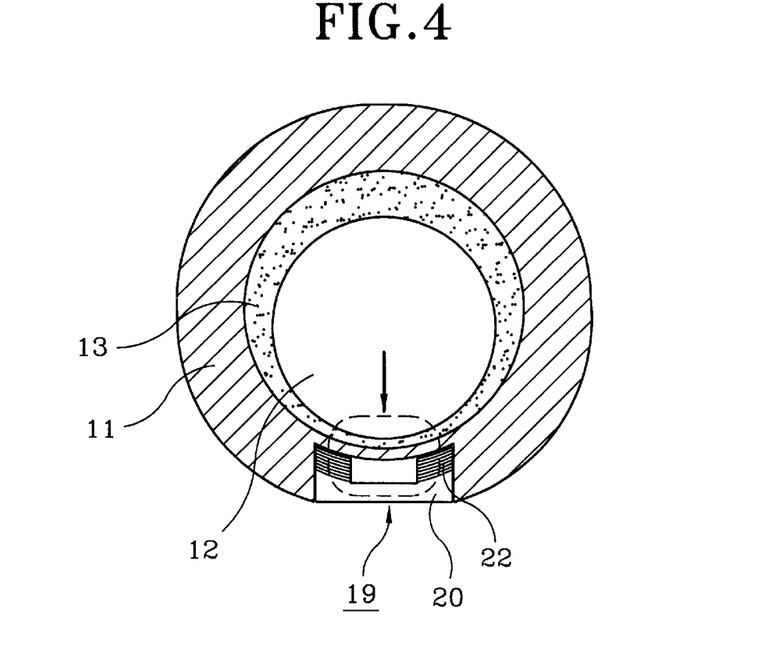
FIG. 4 is a plan sectional view of the electromagnetic force generator of FIG. 3.

The bearing 11 also has an electromagnetic force generator 19, which allows the shaft 12 to keep desired eccentricity during a high speed operation of the shaft 12. The above electromagnetic force generator 19 thus prevents a formation of an oil whirl when the shaft 12 is rotated at a speed higher than a predetermined level. The electromagnetic force generator 19 attracts the shaft 12 in a direction, thus increasing eccentricity of the shaft 12 in the bearing 11. In the preferred embodiment, the electromagnetic force generator 19 is comprised of an electromagnet 20, which is interiorly installed in the bearing 11. FIG. 3 is an exploded perspective view showing the construction of the electromagnetic force generator, while FIG. 4 is a plan sectional view of the electromagnetic force generator. As shown in the drawings, the electromagnet 20 has a rectangular configuration and the bearing 11 has a fitting part 23 for carrying the electromagnet 20.

The electromagnet 20 has four electromagnetic force generating parts 21, each of which extends in a direction perpendicular to the shaft 12. A coil 22 is wound around each of the electromagnetic force generating parts 21 and is selectively turned on in accordance with a rotating speed of the shaft 12. That is, when the shaft 12 is rotated at high speeds and results in a reduction in eccentricity of the shaft 12, the coils 22 of the parts 21 are turned on, while the parts 21 generate electromagnetic force at the same time, thus attracting the shaft 12 to the electromagnet 20. In the drawings, the reference numeral 24 denotes a controller, which checks the rotating speed of the shaft 12 and selectively outputs a start signal for the electromagnet 20 when the rotating speed of the shaft 12 exceeds a predetermined level.

In a brief description, the bearing system according to the primary embodiment has an electromagnetic force generator 19, which allows the shaft 12 to keep desired eccentricity during a high speed operation of the shaft 12. The electromagnetic force generator 19 thus prevents a reduction in eccentricity of the shaft 12 in the bearing during a high speed operation of the shaft 12, thus preventing a reduction in the dynamic pressure of the gap between the bearing 11 and the shaft 12 and removing an oil whirl from the gap. The electromagnetic force generator 19 is comprised of an electromagnet 20, which is fitted into the fitting part 23 of the bearing 11. The electromagnet 20 has four electromagnetic force generating parts 21, each of which extends in a direction perpendicular to the shaft 12. A coil 22 is wound around each of the electromagnetic force generating parts 21 and is selectively turned on in accordance with a rotating speed of the shaft 12. That is, when the shaft 12 is rotated at high speeds and results in a reduction in eccentricity of the shaft 12, the coils 22 of the parts 21 are turned on, while the parts 21 generate electromagnetic force.

When the shaft 12 is rotated at high speeds, the eccentricity of the shaft may be reduced. In such a case, the rotating speed of the shaft 12 is sensed by the controller 24 and the controller 24 selectively outputs a start signal to the coils 22, thus turning on the coils 22. When the coils 22 are turned on, the electromagnetic force generating parts 21 of the electromagnet 20 generate an electromagnetic force, thus attracting the shaft 12 to the electromagnet 20. Therefore, the shaft 12 is forcibly and eccentrically positioned in the bearing 11, thus effectively increasing the dynamic pressure of oil 13 and removing the oil whirl, and improving dynamic characteristics of the motor during a high speed operation of the motor.

Figure 5:
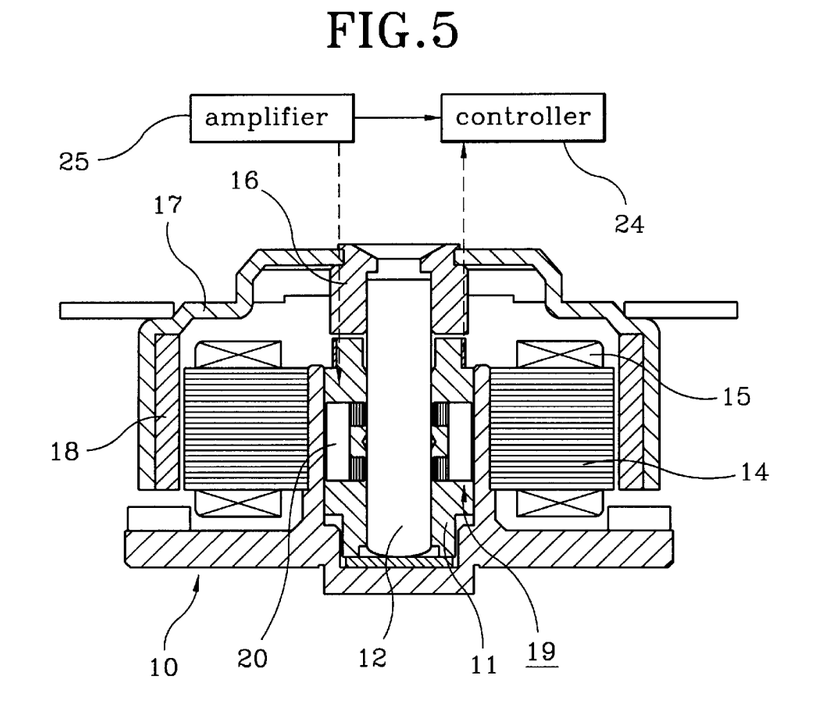
FIG. 5 is a sectional view of a brushless DC motor using a bearing system in accordance with the second embodiment of the present invention.
Figure 6:
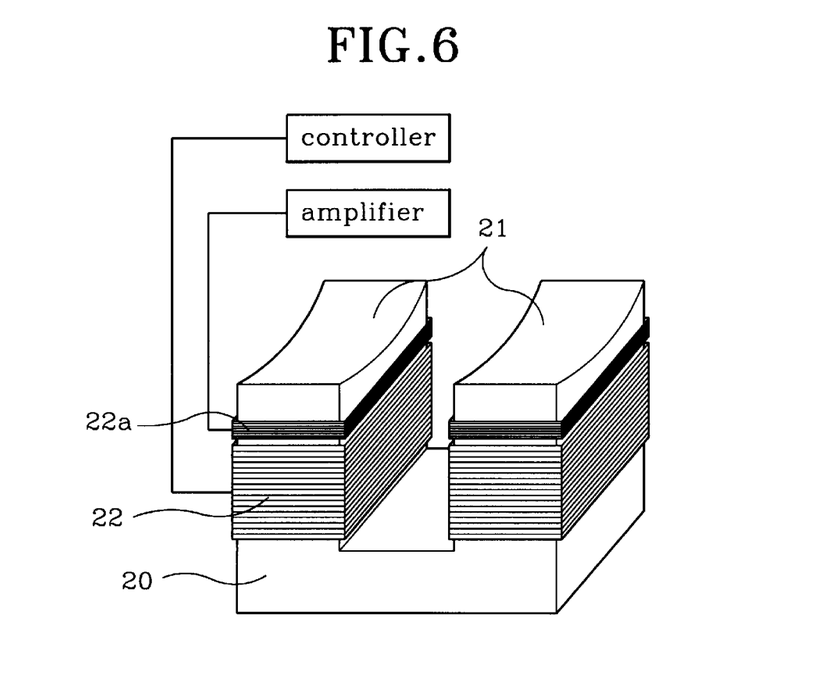
FIG. 6 is an exploded perspective view showing the construction of an electromagnetic force generator included in the bearing system of FIG. 5.
Figure 7:
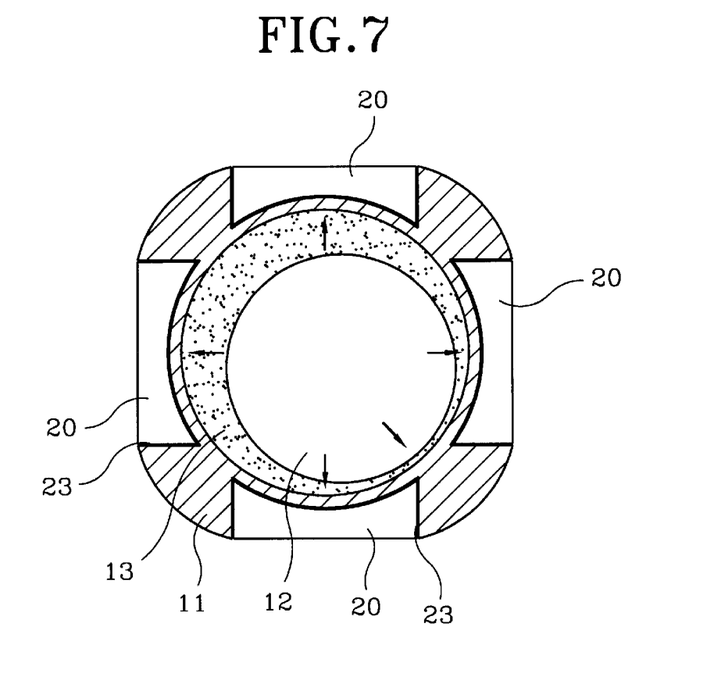
FIG. 7 is a plan sectional view of the electromagnetic force generator of FIG. 6.

FIGS. 5 to 7 show a brushless DC motor using a bearing system in accordance with the second embodiment of this invention. In the second embodiment, most of the elements are common with those of the primary embodiment. Those elements common to both the primary and second embodiments will thus carry the same reference numerals. In the bearing system according to the second embodiment, an electromagnetic force generator 19 is interiorly provided on the bearing 11 for electromagnetically attracting the shaft 12. The electromagnetic force generator 19 thus effectively prevents a formation of an oil whirl when the shaft 12 is rotated at a speed higher than a predetermined level. The electromagnetic force generator 19 electromagnetically attracts the shaft 12 in a desired direction, thus increasing eccentricity of the shaft 12 in the bearing 11.

In the second embodiment, the electromagnetic force generator 19 is comprised of a plurality of electromagnets 20, which are radially arranged in the bearing 11. Each of the electromagnets 20 has a rectangular configuration, while the bearing 11 has a plurality of fitting parts 23 for carrying the electromagnets 20 respectively. Each of the electromagnets 20 has two electromagnetic force generating parts or upper and lower parts 21, each of which extends in a direction perpendicular to the shaft 12. A coil 22 is wound around each of the electromagnetic force generating parts 21 and is selectively turned on in accordance with a rotating speed of the shaft 12. That is, when the shaft 12 is rotated at high speeds and results in a reduction in eccentricity of the shaft 12, the coils 22 of the parts 21 are turned on. Therefore, the electromagnetic force generating parts 21 generate electromagnetic force at the same time, thus attracting the shaft 12 to the electromagnet 20.

In addition, a sensor coil 22a is provided at each of the electromagnetic force generating parts 21 for generating an induction current. The above sensor coil 22a generates a variable induction current in accordance with an interval between the shaft 12 and the electromagnet 20. The variable induction current of each sensor coil 22a is output to a controller 24 through an amplifier 25, thus allowing the electromagnets 20 to be controlled under the control of the controller 24. That is, the sensor coils 22a of the electromagnets 20 are selectively turned on in response to a control signal from the controller, thus allowing the electromagnetic force generating parts 21 to generate an electromagnetic force so as to electromagnetically attract the shaft 12 in a desired direction. Therefore, eccentricity of the shaft 12 in the bearing 11 is increased. For example, when the shaft 12 is rotated at a high speed, the shaft 12 is electromagnetically attracted in a direction by the electromagnets 20, thereby being rotated while being eccentrically positioned in the bearing 11. The shaft 12 is also rotated in the bearing 11 while being continuously and eccentrically positioned relative to the electromagnets 20. That is, the shaft 12 can be rotatable in the bearing 11 through a scroll-type rotation suitable for improving compressibility of oil 13.

In a brief description, the electromagnetic force generator 19 according to the second embodiment is comprised of a plurality of electromagnets 20, which are radially arranged in the bearing 11. The electromagnets 20 are fitted into the fitting parts 23 of the bearing 11. Each of the electromagnets 20 has two electromagnetic force generating parts 21, each of which extends in a direction perpendicular to the shaft 12 and has a coil 22. When the coils 22 of the parts 21 are turned on, the electromagnetic force generating parts 21 generate electromagnetic force at the same time, thus attracting the shaft 12 to the electromagnets 20.

In addition, a sensor coil 22a is provided at each of the electromagnetic force generating parts 21 for generating an induction current. The above sensor coil 22a generates a variable induction current in accordance with an interval between the shaft 12 and the electromagnet 20. The variable induction current of each sensor coil 22a is output to the controller 24 through the amplifier 25. Therefore, each of the electromagnets 20 is appropriately controlled by the controller 24 in response to an induction current of associated sensor coils 22a.

The shaft 12 is controlled as follows. That is, when the shaft 12 is rotated at high speeds, the eccentricity of the shaft may be reduced. In such a case, the sensor coils 22a of the electromagnets 20 generate variable induction currents in accordance with both the distances between the shaft 12 and the coils 22a and a rotating speed of the shaft 12. The variable induction current of each of the sensor coils 22a is output to the controller 24 through the amplifier 25. Upon receiving the induction current from the sensor coils 22a, the controller 24 outputs a start signal to the coils 22 of the electromagnetic force generating parts 21, thus turning on the coils 22. When the coils 22 are turned on, the electromagnetic force generating parts 21 of the electromagnet 20 generate an electromagnetic force, thereby attracting the shaft 12 to the electromagnet 20. Therefore, the shaft 12 is forcibly and eccentrically positioned in the bearing 11 and effectively increases the dynamic pressure of oil 13 and removes the oil whirl, and improving dynamic characteristics of the motor during a high speed operation of the motor. The shaft 12 is also rotatable in the bearing 11 through a scroll-type rotation suitable for improving compressibility of oil 13.

Figure 8:
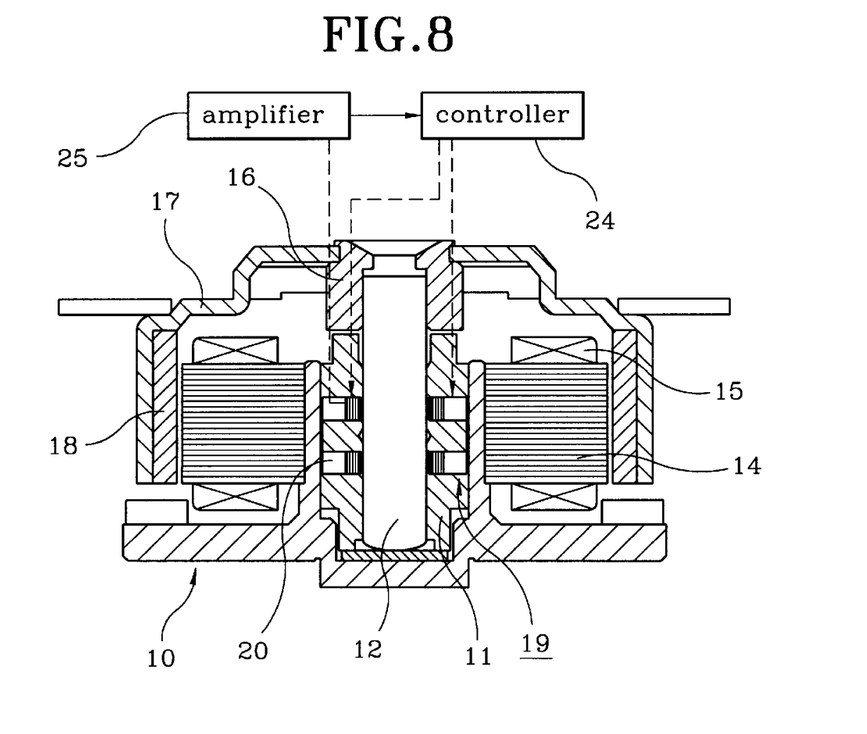
FIG. 8 is a sectional view of a brushless DC motor using a bearing system in accordance with the third embodiment of the present invention.
Figure 9:
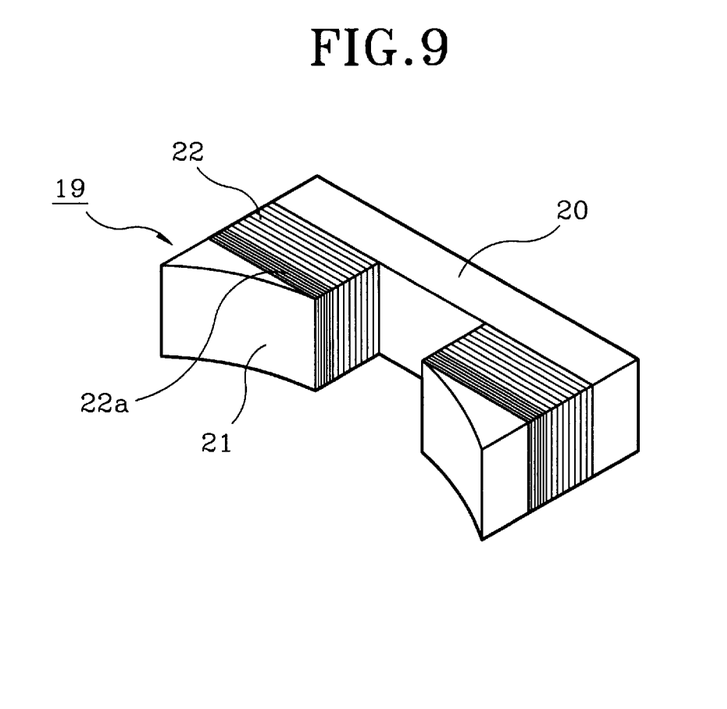
FIG. 9 is an exploded perspective view showing the construction of an electromagnetic force generator included in the bearing system of FIG. 8.
Figure 10:
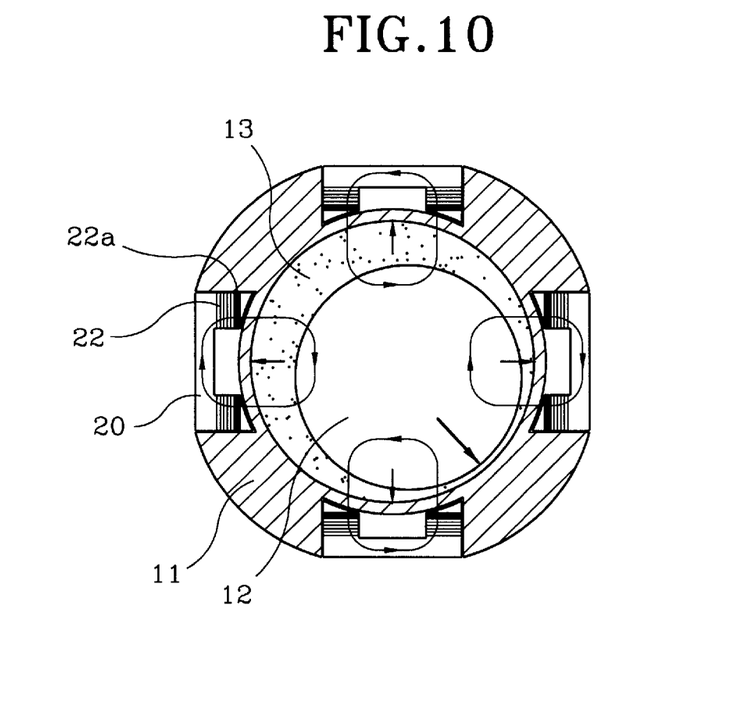
FIG. 10 is a plan sectional view of the electromagnetic force generator of FIG. 9.

FIGS. 8 to 10 show a brushless DC motor using a bearing system in accordance with the third embodiment of this invention. In the third embodiment, most of the elements are common with those of the primary embodiment. Those elements common to both the primary and third embodiments will thus carry the same reference numerals. In the bearing system according to the third embodiment, an electromagnetic force generator 19 is interiorly provided on the bearing 11 for electromagnetically attracting the shaft 12. The electromagnetic force generator 19 thus effectively prevents a formation of an oil whirl when the shaft 12 is rotated at a speed higher than a predetermined level. The electromagnetic force generator 19 electromagnetically attracts the shaft 12 in a desired direction, thus increasing eccentricity of the shaft 12 in the bearing 11. In the third embodiment, the electromagnetic force generator 19 is comprised of a plurality of electromagnets 20, which are radially arranged in the bearing 11 while being spaced apart from each other in an axial direction of the shaft 12. Each of the electromagnets 20 has a rectangular configuration, while the bearing 11 has a plurality of upper and lower fitting parts 23 for carrying the electromagnets 20 respectively.

Each of the electromagnets 20 has two electromagnetic force generating parts 21, each of which extends in a direction perpendicular to the shaft 12. A coil 22 is wound around each of the electromagnetic force generating parts 21 and is selectively turned on in accordance with a rotating speed of the shaft 12. That is, when the shaft 12 is rotated at high speeds and results in a reduction in eccentricity of the shaft 12, the coils 22 of the parts 21 are turned on. Therefore, the electromagnetic force generating parts 21 generate electromagnetic force at the same time, thus attracting the shaft 12 to the electromagnet 20. In addition, a sensor coil 22a is provided at each of the electromagnetic force generating parts 21 for generating an induction current.

The above sensor coil 22a generates a variable induction current in accordance with an interval between the shaft 12 and the electromagnet 20. The variable induction current of each sensor coil 22a is output to a controller 24 through an amplifier 25, thus allowing the electromagnets 20 to be controlled under the control of the controller 24. That is, the sensor coils 22a of the electromagnets 20 are selectively turned on in response to a control signal from the controller 24, thus allowing the electromagnetic force generating parts 21 to generate an electromagnetic force so as to electromagnetically attract the shaft 12 in a desired direction. For example, when the shaft 12 is rotated at a high speed, the shaft 12 is electromagnetically attracted in a direction by the electromagnets 20, thereby being rotated while being eccentrically positioned in the bearing 11. The shaft 12 is also rotated in the bearing 11 while being continuously and eccentrically positioned relative to the electromagnets 20. That is, the shaft 12 can be rotatable in the bearing 11 through a scroll-type rotation suitable for improving compressibility of oil 13. When the electromagnets 20, which are placed at the upper and lower positions in the axial direction of the shaft 12, are simultaneously or alternately operated, the shaft 12 may be selectively operated in a parallel vibration mode as shown in FIG. 11a or a conical vibration mode as shown in FIG. 11b.

In a brief description, the electromagnetic force generator 19 according to the third embodiment is comprised of a plurality of electromagnets 20, which are radially arranged in the bearing 11 at upper and lower positions in the axial direction of the shaft 12. The electromagnets 20 are fitted into the upper and lower fitting parts 23 of the bearing 11. Each of the electromagnets 20 has two electromagnetic force generating parts 21, each of which extends in a direction perpendicular to the shaft 12 and has a coil 22. When the coils 22 of the parts 21 are turned on, the electromagnetic force generating parts 21 generate electromagnetic force at the same time.

In addition, a sensor coil 22*a* is provided at each of the electromagnetic force generating parts 21 for generating an induction current. The above sensor coil 22*a* generates a variable induction current in accordance with an interval between the shaft 12 and the electromagnet 20. The variable induction current of each sensor coil 22*a* is output to a controller 24 through an amplifier 25. Therefore, each of the electromagnets 20 is appropriately controlled by the controller 24 in response to an induction current of associated sensor coils 22*a*.

Figure 11A:
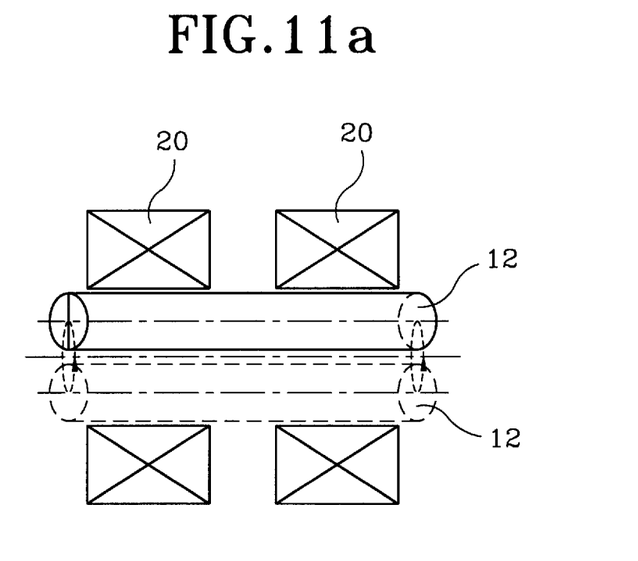
FIGS. 11a and 11b are views schematically showing a vibration mode of the bearing system of FIG. 8.
Figure 11B:
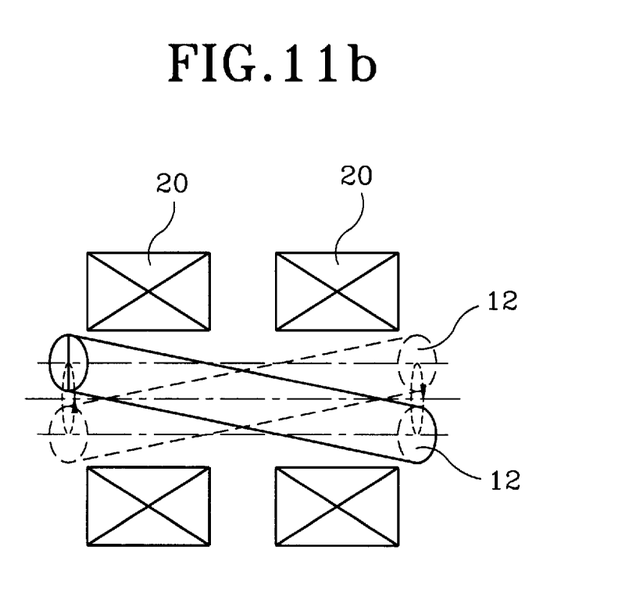

FIG. 11*a* shows the shaft 12 in a parallel vibration mode. In such a parallel vibration mode, the electromagnets 20, which are placed at the upper and lower positions in the axial direction of the shaft 12, are simultaneously operated. Meanwhile, FIG. 11*b* shows the shaft 12 in a conical vibration mode. In such a conical vibration mode, the electromagnets 20, placed at the upper and lower positions in the axial direction of the shaft 12, are alternately operated. Therefore, the shaft 12 is forcibly and eccentrically positioned in the bearing 11 and effectively increases the dynamic pressure of oil 13 and removes the oil whirl, and improving dynamic characteristics of the motor during a high speed operation of the motor. The shaft 12 is also rotatable in the bearing 11 through a scroll-type rotation suitable for improving compressibility of oil 13.

Figure 12:
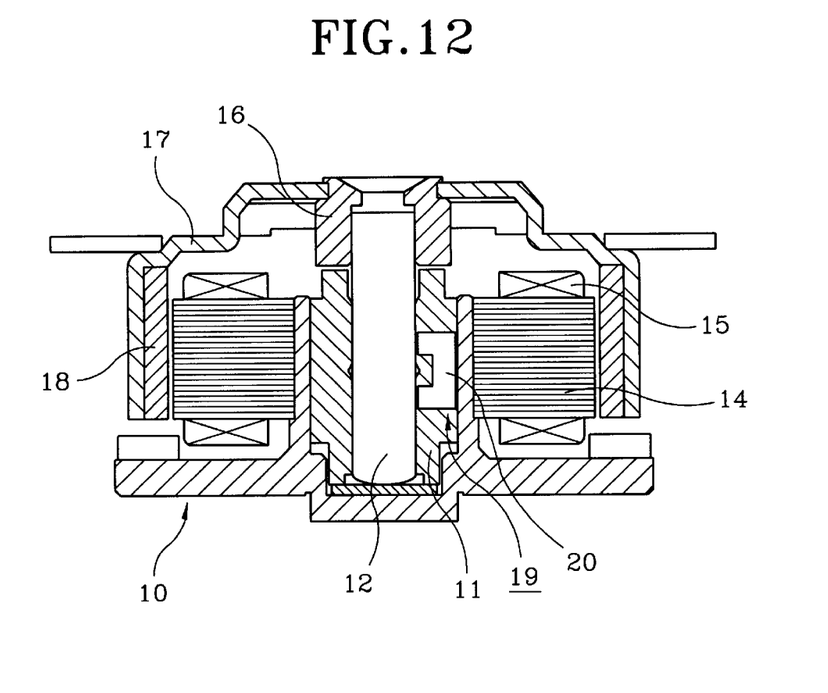
FIG. 12 is a sectional view of a brushless DC motor using a bearing system in accordance with the fourth embodiment of the present invention.
Figure 13:
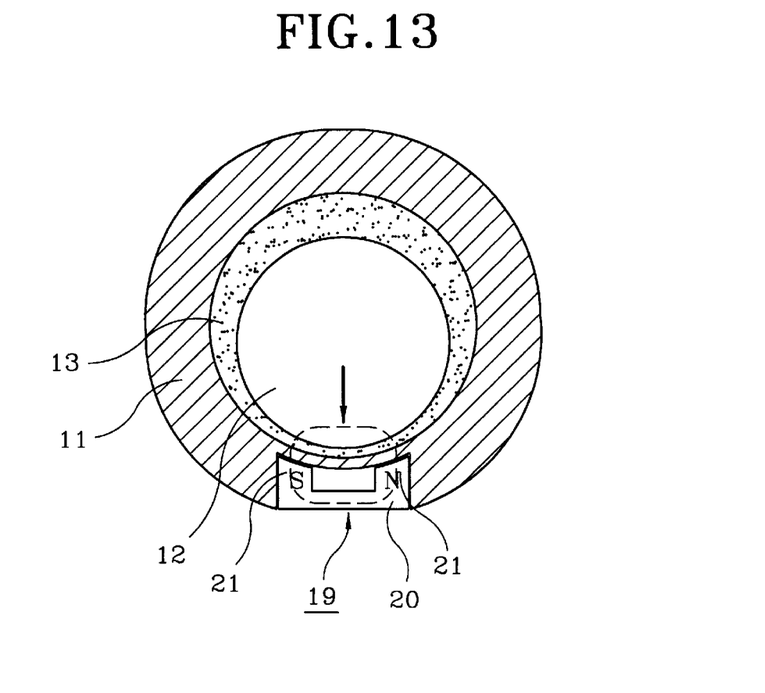
FIG. 13 is a plan sectional view of the electromagnetic force generator of FIG. 12.

FIGS. 12 and 13 show a brushless DC motor using a bearing system in accordance with the fourth embodiment of this invention. In the fourth embodiment, most of the elements are common with those of the primary embodiment. Those elements common to both the primary and fourth embodiments will thus carry the same reference numerals. In the bearing system according to the fourth embodiment, an electromagnetic force generator 19 is interiorly provided on the bearing 11 for electromagnetically attracting the shaft 12. In the third embodiment, the electromagnetic force generator 19 is comprised of a permanent magnet 20, which is provided in the bearing 11. The magnet 20 has a rectangular configuration, while the bearing 11 has a fitting part 23 for carrying the magnet 20. The magnet 20 has a plurality of magnetic force generating parts 21, each of which extends in a direction perpendicular to the shaft 12. Each of the magnetic force generating parts 21 is magnetized so as to effectively keep a desired magnetic flux density capable of magnetically attracting the shaft 12 to the magnet 20.

In a brief description, the bearing system according to the fourth embodiment has an electromagnetic force generator 19, which allows the shaft 12 to be forcibly and eccentrically positioned in the bearing 11. That is, the electromagnetic force generator 19 magnetically attracts the shaft 12 during a high speed operation of the shaft 12, thus making the shaft 12 rotate while being eccentrically positioned in the bearing 11. The bearing system thus effectively prevents any reduction in the dynamic pressure of oil 13 and removes the oil whirl. In the third embodiment, the electromagnetic force generator 19 is comprised of the permanent magnet 20, which is fitted into the fitting part 23 of the bearing 11. The magnet 20 has a plurality of magnetic force generating parts 21, each of which extends in a direction perpendicular to the shaft 12. Each of the magnetic force generating parts 21 is magnetized so as to effectively keep a desired magnetic flux density capable of magnetically attracting the shaft 12 to the magnet 20. In the operation of the motor, the magnetic force generating parts 21 generate a magnetic force, thus magnetically attracting the shaft 12 in a direction. Therefore, during a high speed operation of the shaft 12, the shaft 12 is rotated while being eccentrically positioned in the bearing 11. The bearing system thus effectively prevents any reduction in the dynamic pressure of oil 13 and removes the oil whirl, and improves dynamic characteristics of the motor.

As described above, the present invention provides a bearing system for brushless DC motors. The bearing system has an electromagnetic force generator in a bearing so as to generate an electromagnetic force or a magnetic force. The bearing system thus magnetically attracts the shaft when eccentricity of the shaft in the bearing is reduced during a high speed operation of the shaft, thus allowing the shaft to keep desired eccentricity in the bearing and increasing dynamic pressure of oil in the bearing and improving dynamic characteristics of the motor such as low operational vibrations and noises during a high speed operation of the motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A brushless DC motor, comprising:

a stator with a coil;

a base panel used as a holding panel for said stator;

a rotatable shaft acting as a rotating shaft of said motor;

a rotor, comprising:
  a cylindrical sidewall portion coaxially coupled to said shaft and coaxially surrounding said stator;
  a rotor holder coaxially coupling the cylindrical sidewall portion to the top end portion of said shaft; and
  a magnet attached to the inner surface of said cylindrical sidewall portion and positioned around the stator while forming an air gap between the stator and the magnet;

a bearing system positioned inside said stator for rotatably supporting the shaft, thus allowing the shaft to be coaxially rotatable relative to said stator, said bearing system comprising:
  an inner wall portion interiorly and rotatably holding said shaft with a variable oil gap being defined between the shaft and the inner wall;
  an outer wall surrounding said inner wall and being used as a holding surface of the bearing system;
  top and bottom walls integrating the inner and outer walls into a single structure at the top and bottom ends of the inner and outer walls; and
  at least one electromagnetic force generator for selectively generating an electromagnetic force so as to magnetically and radially attract said shaft, thus forming a dynamic pressure in oil in said oil gap, said electromagnetic force generator being positioned at an intermediate portion between said inner and outer walls; and
  a controller for selectively turning on said electromagnetic force generator, thus allowing the electromagnetic force generator to magnetically attract the shaft when the dynamic pressure of the oil is reduced during a high speed operation of said shaft.

2. The brushless DC motor according to claim 1, wherein said electromagnetic force generator comprises:
an electromagnetic force generating part; and
a coil wound around said electromagnetic force generating part.

3. The brushless DC motor according to claim 1, wherein said electromagnetic force generator comprises:
an electromagnetic force generating part; and
a sensor coil wound around said electromagnetic force generating part for selectively generating a variable induction current in accordance with the variable size of said oil gap defined between the shaft and the inner wall;
an amplifier connected to said sensor coil for amplifying the induction current from said sensor coil prior to outputting the induction current to said controller; and
a second coil wound around said electromagnetic force generating part for selectively generating an electromagnetic force in response to a control signal from said controller, thus magnetically attracting said shaft.

4. The brushless DC motor according to claim 1, further comprising at least one or more electromagnetic force generators, said electromagnetic force generators being radially positioned around said shaft while being angularly spaced out at regular intervals.

5. The brushless DC motor according to claim 4, wherein said electromagnetic force generator comprises:
an electromagnetic force generating part; and
a coil wound around said electromagnetic force generating part.

6. The brushless DC motor according to claim 4, wherein said electromagnetic force generator comprises:
an electromagnetic force generating part; and
a sensor coil wound around said electromagnetic force generating part for selectively generating a variable induction current in accordance with the variable size of said oil gap defined between the shaft and the inner wall;
an amplifier connected to said sensor coil for amplifying the induction current from said sensor coil prior to outputting the induction current to said controller; and
a second coil wound around said electromagnetic force generating part for selectively generating an electromagnetic force in response to a control signal from said controller, thus magnetically attracting said shaft.

7. The brushless DC motor according to claim 1, further comprising at least one or more electromagnetic force generators, said electromagnetic force generators being arranged along said shaft while being spaced out at regular intervals.

8. The brushless DC motor according to claim 7, wherein said electromagnetic force generator comprises:
an electromagnetic force generating part; and
a coil wound around said electromagnetic force generating part.

9. The brushless DC motor according to claim 7, wherein said electromagnetic force generator comprises:
an electromagnetic force generating part; and
a sensor coil wound around said electromagnetic force generating part for selectively generating a variable induction current in accordance with the variable size of said oil gap defined between the shaft and the inner wall;
an amplifier connected to said sensor coil for amplifying the induction current from said sensor coil prior to outputting the induction current to said controller; and
a second coil wound around said electromagnetic force generating part for selectively generating an electromagnetic force in response to a control signal from said controller, thus magnetically attracting said shaft.

10. A brushless DC motor, comprising:
a stator with a coil;
a base panel used as a holding panel for said stator;
a rotatable shaft acting as a rotating shaft of said motor;
a rotor, comprising:
a cylindrical sidewall portion coaxially coupled to said shaft and coaxially surrounding said stator;
a rotor holder coaxially coupling the cylindrical sidewall portion to the top end portion of said shaft; and
a magnet attached to the inner surface of said cylindrical sidewall portion and positioned around the stator while forming an air gap between the stator and the magnet;
a bearing system positioned inside said stator for rotatably supporting the shaft, thus allowing the shaft to be coaxially rotatable relative to said stator, said bearing system comprising:
an inner wall portion interiorly and rotatably holding said shaft with a variable oil gap being defined between the shaft and the inner wall;
an outer wall surrounding said inner wall and being used as a holding surface of the bearing system;
top and bottom walls integrating the inner and outer walls into a single structure at the top and bottom ends of the inner and outer walls; and
at least one permanent magnet for selectively generating a magnetic force so as to magnetically and radially attract said shaft, thus forming a dynamic pressure in oil in said oil gap, said permanent magnet being positioned at an intermediate portion between said inner and outer walls.

11. The brushless DC motor according to claim 10, further comprising at least one or more permanent magnets, said permanent magnets being arranged along said shaft while being spaced out at regular intervals.

12. A bearing system for brushless DC motors, comprising:
an inner wall portion interiorly and rotatably holding a shaft with a variable oil gap being defined between the shaft and the inner wall;
an outer wall surrounding said inner wall and being used as a holding surface of the bearing system;
at least one electromagnetic force generator for selectively generating an electromagnetic force so as to magnetically and radially attract said shaft, thus forming a dynamic pressure in oil in said oil gap, said electromagnetic force generator being positioned at an intermediate portion between said inner and outer walls;
top and bottom walls integrating the inner and outer walls into a single structure at the top and bottom ends of the inner and outer walls; and
a controller for selectively turning on said electromagnetic force generator, thus allowing the electromagnetic force generator to magnetically attract the shaft when the dynamic pressure of the oil is reduced during a high speed operation of said shaft.

13. The bearing system according to claim 12, wherein said electromagnetic force generator comprises:

an electromagnetic force generating part; and a coil wound around said electromagnetic force generating part.

14. The bearing system according to claim 12, wherein said electromagnetic force generator comprises:

an electromagnetic force generating part; and a sensor coil wound around said electromagnetic force generating part for selectively generating a variable induction current in accordance with the variable size of said oil gap defined between the shaft and the inner wall;

an amplifier connected to said sensor coil for amplifying the induction current from said sensor coil prior to outputting the induction current to said controller; and a second coil wound around said electromagnetic force generating part for selectively generating an electromagnetic force in response to a control signal from said controller, thus magnetically attracting said shaft.

15. The bearing system according to claim 12, further comprising at least one or more electromagnetic force generators, said electromagnetic force generators being radially positioned around said shaft while being angularly spaced out at regular intervals.

16. The bearing system according to claim 15, wherein said electromagnetic force generator comprises:

an electromagnetic force generating part; and a coil wound around said electromagnetic force generating part.

17. The bearing system according to claim 15, wherein said electromagnetic force generator comprises:

an electromagnetic force generating part; and a sensor coil wound around said electromagnetic force generating part for selectively generating a variable induction current in accordance with the variable size of said oil gap defined between the shaft and the inner wall;

an amplifier connected to said sensor coil for amplifying the induction current from said sensor coil prior to outputting the induction current to said controller; and a second coil wound around said electromagnetic force generating part for selectively generating an electromagnetic force in response to a control signal from said controller, thus magnetically attracting said shaft.

18. The bearing system according to claim 12, further comprising at least one or more electromagnetic force generators, said electromagnetic force generators being arranged along said shaft while being spaced out at regular intervals.

19. The bearing system according to claim 18, wherein said electromagnetic force generator comprises:

an electromagnetic force generating part; and a coil wound around said electromagnetic force generating part.

20. The bearing system according to claim 18, wherein said electromagnetic force generator comprises:

an electromagnetic force generating part; and a sensor coil wound around said electromagnetic force generating part for selectively generating a variable induction current in accordance with the variable size of said oil gap defined between the shaft and the inner wall;

an amplifier connected to said sensor coil for amplifying the induction current from said sensor coil prior to outputting the induction current to said controller; and a second coil wound around said electromagnetic force generating part for selectively generating an electromagnetic force in response to a control signal from said controller, thus magnetically attracting said shaft.

21. A bearing system for brushless DC motors, comprising:

an inner wall portion interiorly and rotatably holding a shaft with a variable oil gap being defined between the shaft and the inner wall;

an outer wall surrounding said inner wall and being used as a holding surface of the bearing system;

top and bottom walls integrating the inner and outer walls into a single structure at the top and bottom ends of the inner and outer walls; and at least one permanent magnet for selectively generating a magnetic force so as to magnetically and radially attract said shaft, thus forming a dynamic pressure in oil in said oil gap, said permanent magnet being positioned at an intermediate portion between said inner and outer walls.

22. The bearing system according to claim 21, further comprising at least one or more permanent magnets, said permanent magnets being arranged along said shaft while being spaced out at regular intervals.

* * * * *